(12) United States Patent
Harney et al.

(10) Patent No.: US 6,240,667 B1
(45) Date of Patent: Jun. 5, 2001

(54) HOLDER FOR AN AIRLINE-TYPE FOLD-DOWN TRAY

(76) Inventors: Shane Harney; Nigel Harris; Ed Greenwood, all of c/o 531 63 Avenue NW., Calgary, Alberta (CA), T2K 5L3

( * ) Notice: Subject to any disclaimer, the term of this patent is extended or adjusted under 35 U.S.C. 154(b) by 0 days.

(21) Appl. No.: 09/396,977

(22) Filed: Sep. 15, 1999

(51) Int. Cl.[7] .................................... G09F 3/20
(52) U.S. Cl. .................. 40/649; 108/90; 40/320
(58) Field of Search .................. 40/320, 649, 653, 40/654, 661, 727, 661.08; 108/90

(56) References Cited

U.S. PATENT DOCUMENTS

| D. 356,471 | 3/1995 | Corsi . | |
|---|---|---|---|
| 1,210,004 | * 12/1916 | Roe ........................................ | 108/90 |
| 1,566,412 | 12/1925 | Livinger . | |
| 2,131,586 | 9/1938 | Dano . | |
| 4,505,059 | 3/1985 | Morris . | |
| 4,524,867 | 6/1985 | Klein et al. . | |
| 4,531,312 | 7/1985 | Stoddart . | |
| 4,545,140 | 10/1985 | Winston . | |
| 4,593,876 | 6/1986 | Greiner . | |
| 4,738,038 | 4/1988 | Tanne et al. . | |
| 4,957,256 | 9/1990 | Boeding . | |
| 4,979,325 | 12/1990 | White . | |
| 5,010,668 | 4/1991 | Zeligson . | |
| 5,197,215 | 3/1993 | Torsleff . | |
| 5,309,659 | 5/1994 | Eastman . | |
| 5,456,033 | 10/1995 | Sachnoff . | |
| 5,609,319 | 3/1997 | Kelley . | |
| 5,655,323 | 8/1997 | Lassoff . | |
| 5,720,515 | * 2/1998 | Haffner .................................. | 40/320 |
| 5,755,338 | 5/1998 | vom Braucke et al. . | |

FOREIGN PATENT DOCUMENTS

| 2276649 | 2/1976 | (FR) . | |
|---|---|---|---|
| 2556117 | * 6/1985 | (FR) ..................................... | 40/200 |

* cited by examiner

Primary Examiner—Cassandra H. Davis
(74) Attorney, Agent, or Firm—Gene Scott-Patent Law & Venture Group

(57) ABSTRACT

A support provides a window for the display of advertising material. The support has a gripping feature on opposing sides for engaging an airline fold-down tray by its side edges. A bottom flange functions as a position limiting device so that the support is correctly positioned onto the tray. The advertising medium is held within a groove between the window and the under surface of the fold-down tray.

6 Claims, 2 Drawing Sheets

HOLDER FOR AN AIRLINE-TYPE FOLD-DOWN TRAY

BACKGROUND OF THE INVENTION

1. Field of the Invention

This invention relates generally to mechanical supports for advertisement materials, and more particularly to such a holder capable of being engaged with an airline-type fold-down tray so as to place an advertisement sheet in plain view of a seated passenger.

2. Description of Related Art

The following art defines the present state of this field:

Corsi, U.S. Pat. No. D356,471 provides the ornamental design for the compartmented food tray for a ball stadium.

Lovinger, U.S. Pat. No. 1,566,412 describes a tray comprising a transparent plate, a coat of dark paint covering part of the rear face of the plate leaving transparent the appearance of certain designs at certain predetermined spots, a tin-foil background placed on the paint, a felt cushion carrying the plate, a reinforcing cushion formed in the center of the felt cushion, a wooden bottom, and a frame for the whole to which the bottom is attached, and a pair of handles.

Dano, U.S. Pat. No. 2,131,586 describes an advertising holder construction comprising a frame member providing a display opening in substantially upright position, a card panel ember having a plurality of card guide slots open at their upper ends for the mounting of advertising cards, the bottom of the card panel member being mounted in pivotal relation to the bottom margin of the display opening whereby the panel member may be swung from upright or card display position into outwardly inclined position for card inserting and changing purposes, the upper side of the frame member projecting over the upper open ends of said card guide slots to prevent removal of the cards when in display position and means for securing the card panel member in upright or display position within said display opening.

Klein et al., U.S. Pat. No. 4,524,867 describes a case for accommodating written material for presentation including a clear box formed of transparent plastic having walls and an interior, and receptacles for written material being disposed in the interior of the box allowing the written material to be read through the walls of the box, the receptacles being adapted to the format of the written material for preventing sliding of the written material.

Morris, U.S. Pat. No. 4,505,059 describes an advertising display apparatus comprising a base, means on the base for holding condiments, a plurality of support members on the base, each facing in a different respective direction, means form mounting at least one advertisement on each support member, means mounting the support members for movement relative to the base to change the direction in which a given advertisement faces. A hollow, transparent tube having a plurality of walls constitutes transparent cover means for enclosing and protectively covering the support members. Each support member and its respective advertisement faces a respective wall on the tube. A resilient, strip-like member is located within the tube and is resiliently deformable between and expanded, open first condition and a second condition in which it is at least partially closed for urging the advertisement toward its respective wall on the tube. The apparatus is preferably displayed on restaurant tables so that customers can view the advertisements during their meal. The tube is of a size which preferably accommodates twelve business cards; three cards per support member.

Stoddart, U.S. Pat. No. 4,531,312 describes a baggage tag retainer adaptable to be permanently bonded to the exterior of a luggage container. The retainer is shaped so as to detachably retain a conventional airline destination baggage claim tag and is marked with a permanent identification number that is concealed from view when the airline baggage tag is mounted in the retainer. By means of this invention, baggage destination tags will be more securely fixed to luggage so as to prevent loss of the tag during the normal handling of the luggage on conveyor systems and the luggage will be permanently identified with the owner, while all such owner identification is concealed from view of unauthorized persons during transport of the luggage.

Winston, U.S. Pat. No. 4,545,140 describes a graphic staging device for displaying substantially two-dimensional graphics such as a sign or the like of generally planar configuration, preferably in at least a slightly arcuate presentation and for protecting the same from ambient exposure, is comprised of first and second staging member which are nearly identical, having longitudinal asymmetry such that the two may be nested in mechanically interlocked, transversely mirror-imaged face-to-face engagement. There are very slight dimensional variations between the two staging members; in one instance the overall dimensions are identical but thickness differs, in another instance the dimensional variations are on the same order as the thickness of the members or less.

Greiner, U.S. Pat. No. 4,593,876 describes a picture stand for several pictures, which consists essentially of two prisms of equal length and size and whose section is a right-angled isosceles triangle. The prisms are located in a mount such that the two rectangular prism faces on a cathetus are mutually aligned and the two other rectangular prism faces on a cathetus are a small distance apart and pictures allocated to these prism faces are placed between them. Each of the plane rectangular prism faces on the hypotenuses also has a picture placed flat against it. The pictures are with their picture sides facing the prism faces. This picture stand represents a new interesting possibility for holding four pictures of which only two are visible at a time depending on the direction of view. Compared with conventional picture stands for several pictures the space required is significantly reduced and apart from standing firmly, and interesting optical effect is achieved.

Tanne et al., U.S. Pat. No. 4,738,038 describes a lightweight compact, portable, advertising display apparatus provides and attractive, rotatable, miniature billboard assembly for displaying advertising material to viewing areas about the advertising display apparatus. The advertising display apparatus includes a plastic shaft with a convenient handle and a special coupling head which fits into corresponding keyholes in the container assembly to provide for easy assembly and disassembly of the unit when inserting and removing different advertising material.

Boeding, U.S. Pat. No. 4,957,256 describes a price tag display holder and support arm device for use with a peg-bar display of peggable packages which are arranged in both vertical and horizontal rows without appreciable spacing between the vertical and horizontal edges of packages in adjacent rows. The device has a strap-like support arm which is upright or on edge in use. The support arm has a proximal end which is connected in cantilever fashion to one of the vertically spaced horizontal peg supports located at the rear of the packages and a distal end on which a price tag display holder is mounted. The support arm is of adjustable length to permit an adjusted length that places the price tag display holder for viewing by a customer looking in the direction of the aisle. The strap-like support arms of the devices are sufficiently thin so as to permit the arms to be squeezed in between packages in adjacent vertical rows. The devices of the invention permit dispensing with the peg pricing bars that separate horizontal rows of packages in conventional peg-bar package display systems and thereby allow more packages to be displayed within the confines of the same overall available area.

White, U.S. Pat. No. 4,979,325 describes a display frame for displaying photographs and other sheet-like articles comprising and outer shell, a liner and a threaded cap. The outer shell is transparent, generally cup-shaped and has a tapered inner wall. The liner has a tapered outer surface upon which are positioned a series of ribs, with the taper of the outer surface of the liner closely matched to that of the inner wall of the outer shell. Photographs or photocopies may be secured to one another and trimmed into an arcuate array and the array placed within the outer shell. As the liner is inserted into the outer shell, the ribs contact the array and act as "skis" to allow the liner to be moved relative to the array without tearing, crumpling or otherwise marking the array.

Zeligson, U.S. Pat. No. 5,010,668 describes and improvement in airliner seat backs an snack tray tables facilitating the display of replaceable printed or pictorial materials for viewing by passengers seated rearwardly of the display. The materials are displayed through a transparent window pane overlapping the interior perimeter of a window in the rear portion of the seat back or the top or bottom sides of the table. The printed or pictorial materials are releaseably held in face-to-face relationship with the window pane by various means depending on the structure of the seat back or table. The improvement is adapted to existing tray tables by use of a thin resiliently flexible member fitted to the contours of the tray table and releaseably snappable to the table with the printed or pictorial materials in place.

Torsleff, U.S. Pat. No. 5,197,215 describes a universal label holder having a plurality of attachments which are functionally designed for different kinds of display units. The label holder has a first assembly extending therefrom that allows a display unit attachment to be connected thereto. Several different display unit attachments each having a second assembly to connect to the first assembly may be used with the label holder. The different display unit attachments also each have fixing part to connect to a display unit. Thus, the universal label support achieves uniform labeling for a group of different display units in the same store.

Eastman, U.S. Pat. No. 5,309,659 describes a picture frame having a substantially stiff, rectangular, planar transparent sheet with lip members disposed on two rear opposing sides to slideably receive therein the object to be displayed directly behind the transparent sheet and a sheet of magnetic material to be received within said lips directly behind the object to be displayed. The magnetic sheet, when placed against a metallic surface, holds the frame in place by its attraction to such metallic surface.

Sachnoff, U.S. Pat. No. 5,456,033 describes an advertising display for holding and displaying printed advertisements above a flat surface including first and second transparent, vertical plates disposed parallel to and in close proximity to one another and a support for holding the first and second transparent parallel plates above a flat surface. The support includes first and second diagonally disposed leg portions, each of which includes two parallel plates and an end piece which attaches the two parallel plates at an edge thereof. The first and second vertical plates are capable of holding a first and advertisement therebetween in a replaceable manner while the plates of the first and second leg portions are capable of holding second and third advertisements therebetween in a permanent manner. The advertising display further includes a lip attached to one of the vertical plates for retaining the first advertisement therebetween. Furthermore, one of the plates of each of the first and second leg portions includes a ledge on edges thereof to retain the second and third advertisements between the plates of the first and second leg portions, respectively.

Kelley, U.S. Pat. No. 5,609,319 describes a card with magnetic strips on the back of the card mount the card on a metallic, vertical surface. The front of the card contains a bifurcated holder in the shape of a wish bone which is anchored at one end to the card. The central portion of the wish bone has a resilient band to hold the free end of the wish bone against the card. By slipping a lottery ticket between the free end of the wish bone and the card, a lottery ticket will be safely stored against loss.

Lassoff, U.S. Pat. No. 5,655,323 describes a message or note board that is also a holder for mail contracted of recycled plastic material and assembled with common hand tools so that after final use, the parts may be segregated for further recycling. The note board has a flat plastic backing or plate that can be attached to a wall or a door on a refrigerator. Attached to the front surface is a transparent sheet that can be written on with a dry-erasable pen. A sheet of paper may be inserted between the transparent sheet and the backing plate and contains information the lower end of the plate has an L-shaped tray or ledge that supports mail.

Vom Brauck et al., U.S. Pat. No. 5,755,338 describes a bulletin board structure including a ferromagnetic board which is coated so that it can be written on and a container removably mounted on a lower end of the board. The container includes a plurality of upwardly open compartments. At least one of the compartments has slots formed in opposing walls thereof for receiving the axle stubs of tape roll. The container can also include holes for receiving.

Hausberg, FR 7423372 describes a publicity display means in the form of furniture such as a table, seat or similar, has a surface having a movable transparent panel which covers all or part of the surface area of the furniture on which it is installed. The publicity medium is on a sheet of material. The transparent panel is supported by a frame fitted with and element forming one of its sides, around which the frame pivots. A locking element formed by an elastic surface occupies all or part of the side opposite to the frame, which forms a clip. The publicity sheet is inserted between the surface of the furniture and the transparent panel.

The prior art teaches various frames and frames for supporting advertising materials including adaptations providing mounting such materials in airline seats, taxicabs and the like. However, the prior art does not teach that a frame may be married to an existing fold-down tray in the manner of the present disclosure. The present invention teaches a novel manner of installing advertising materials onto airline fold-down trays and provides further related advantages as described in the following summary.

SUMMARY OF THE INVENTION

The present invention teaches certain benefits in construction and use which give rise to the objectives described below.

The present invention provides a support apparatus capable of holding an advertisement on an airline-type fold-down tray. It provides a slot for placement of the advertisement between the support and the tray.

A primary objective of the present invention is to provide a simple advertisement support for an airline tray having advantages not taught by the prior art.

Another objective is to provide such a support engagable with the tray without modification of the tray or the airline seat.

A further objective is to provide such a support that is easily engaged with the airline seat for relatively quick and easy replacement of the advertisement sheet.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention. In such drawings.

DETAILED DESCRIPTION OF THE INVENTION

Figure 1:
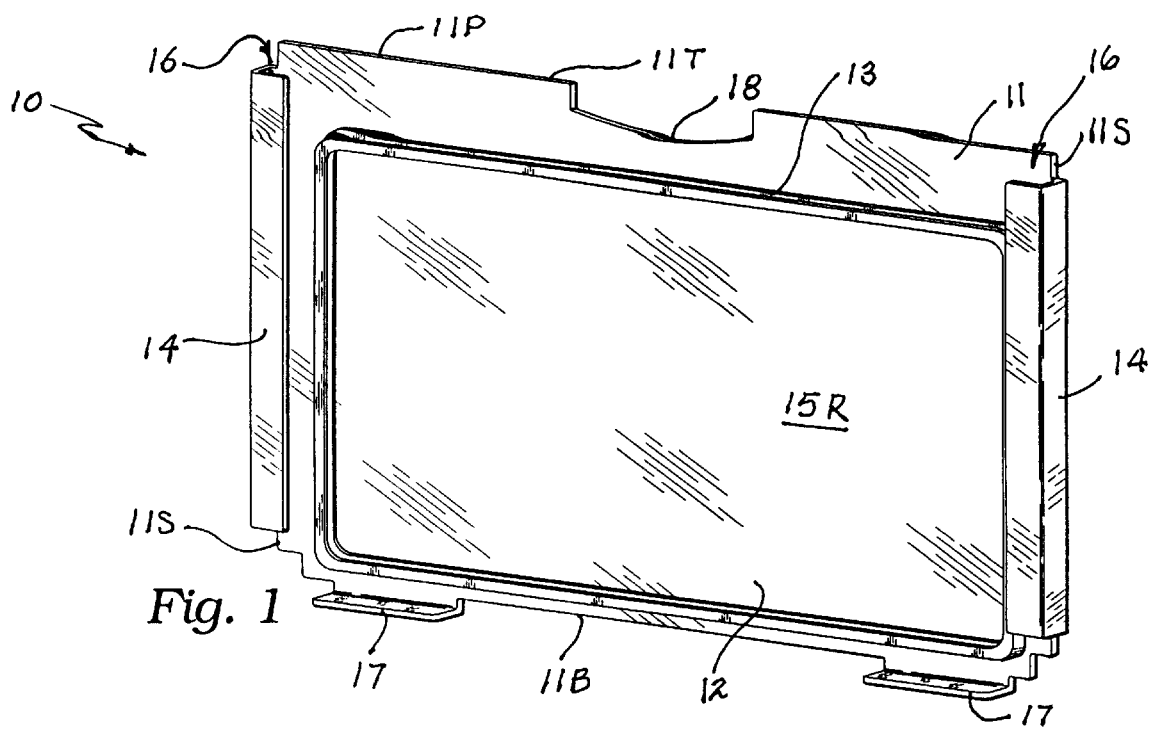
FIG. 1 is a rear perspective view of an advertising medium support in a preferred embodiment of the present invention.
Figure 3:
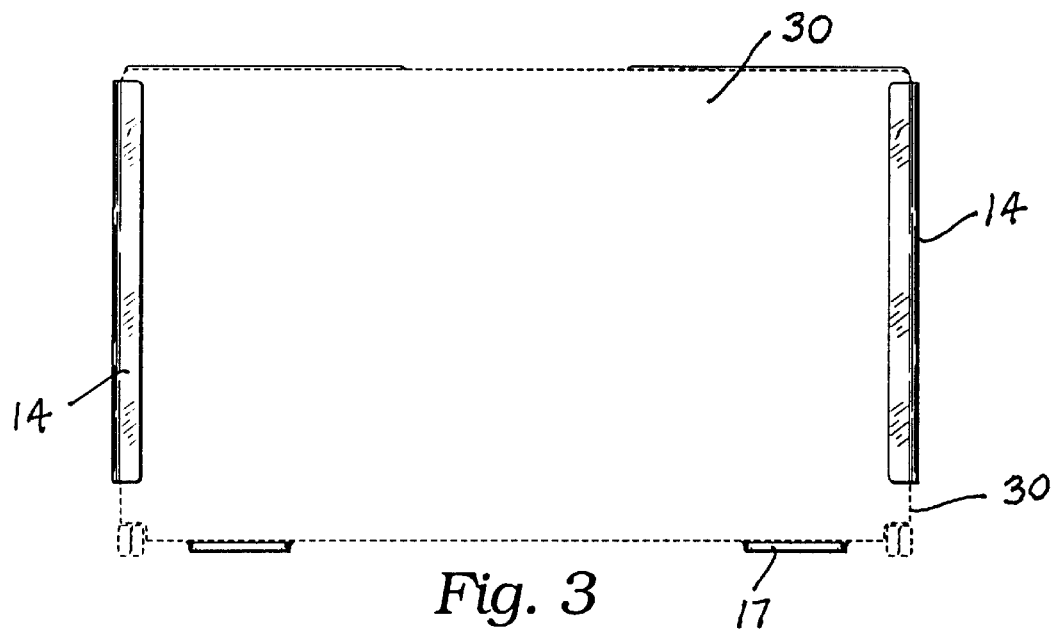
FIG. 3 is a top plan view of the fold-down tray when placed in the lowered position indicating how the support is engaged therewith.
Figure 4:
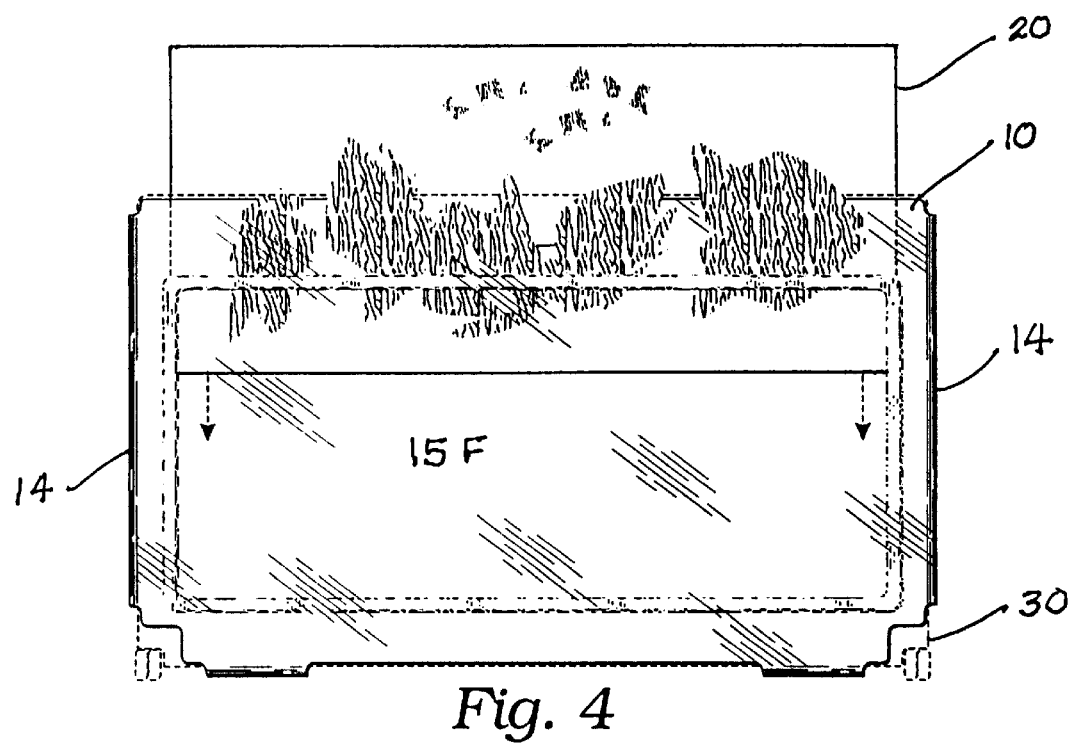
FIG. 4 is a front elevational view thereof when the tray is in the up and locked position and showing the placement of an advertising medium into the support.

The above described drawing figures illustrate the invention defined in a first embodiment as an advertising medium support apparatus 10, in a second embodiment as a combination said support apparatus 10 and advertising medium 20, and in a third embodiment as a combination said support apparatus 10, advertising medium 20 and airline-type fold-down tray 30 onto which the support apparatus 10 is able to be engaged in cooperation for display of the advertising medium 20. In each of the embodiments the support apparatus 10 is the key component for accomplishing the goals of the present invention. The fold-down airline-type tray 30 may be any of the well known such trays 30 as used in commercial air travel and is generally attached to the back of an airline seat (not shown) where it may be placed in an up-and-locked position when not in use as shown in FIG. 4 where we see the support apparatus 10 from its front surface 15F. The tray 30 may also be lowered for use as a writing surface or a dining table as shown in FIG. 3. The advertising medium 20 is typically one or more paper or paperboard sheets with advertising indicia printed on one or both sides. The advertising medium support 10 is typically made of a tough plastic material molded to the final shape shown in FIG. 1 for use, and comprises a generally rectangular and planar ad plate 11, providing a transparent window 12 visible from a front surface thereof as shown in FIG. 4. The transparent window 12 is adapted for receiving the advertising medium 20 in any of a variety of possible ways, but in the preferred embodiment, such receiving is accomplished by sliding the advertising medium into a slot 13 peripheral to the transparent window 12. The ad plate 11 is primarily defined by an ad plate peripheral edge 11P comprising two pairs of opposing parallel edge portions, including a top and bottom opposing edges 11T and 11B, and a left side and a right side opposing edges 11S.

Figure 2:
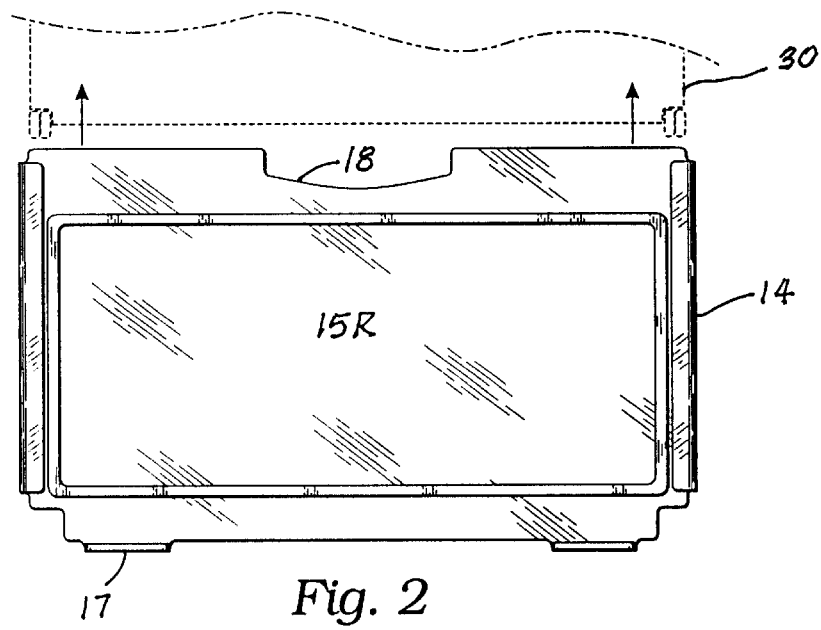
FIG. 2 is a rear elevational view thereof showing how the support is mounted onto an airline-type fold-down tray.

A side edge flange 14 depends laterally from each one of the left and the right side opposing edges 11S of the ad plate 11. The edge flanges 14 are each directed laterally away from a rear surface 15R of the ad plate 11 and are configured with a means for gripping 16 such as a slot for engaging opposing edges of the airline-type tray 30 when the advertising medium support 10 is engaged with the airline-type tray 30 as is best shown in FIG. 3 and also in FIG. 2 where the method of engaging the tray 30 with the support apparatus 10 is shown. A bottom flange position limiting means 17 depends laterally from the bottom edge 11B and is also directed away from the rear surface 15R. A lock clearance notch 18 is provided in the top edge 11T of the ad plate 11 so as to provide clearance for a tray lock (not shown) when the advertising medium support 10 is engaged with the airline-type tray 30 in an up-and-locked position (FIG. 4) for viewing the advertising medium 20 through the transparent window 12.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A unitary advertising medium support apparatus comprising:

a generally rectangular and planar ad plate providing a transparent window positioned within a front surface thereof, the ad plate being primarily defined by an ad plate peripheral edge comprising two pairs of opposing parallel edge portions, including a top and bottom opposing edges and a left side and a right side opposing edges;

a side edge flange depending laterally from each one of the left and the right side opposing edges of the ad plate, the edge flanges each directed laterally away from a rear surface of the ad plate and configured with a means for gripping a tray;

a bottom flange position limiting means depending laterally from the bottom edge and directed away from the rear surface; and a slot, the slot being positioned peripherally about the entire transparent window, the slot adapted for receiving the advertising medium therein.

2. The apparatus of claim 1 further comprising a lock clearance notch provided in the top edge of the ad plate so as to provide clearance for a tray lock when the advertising medium support is engaged with an airline type in an up-and-locked position for viewing the advertising medium through the transparent window.

3. A combination unitary advertising medium support apparatus and an advertising medium comprising:

a generally rectangular and planar ad plate providing a transparent window positioned within a front surface thereof, the transparent window engaging the advertising medium within a means defining a slot, the slot being positioned peripherally about the entire transparent window, the ad plate being primarily defined by an ad plate peripheral edge comprising two pairs of opposing parallel edge portions, including a top and bottom opposing edges and a left side and a right side opposing edges;

a side edge flange depending laterally from each one of the left and the right side opposing edges of the ad plate, the edge flanges each directed laterally away from a rear surface of the ad plate and configured with a means for gripping a tray; and a bottom flange position limiting means depending laterally from the bottom edge and directed away from the rear surface.

4. The apparatus of claim 3 further comprising a lock clearance notch provided in the top edge of the ad plate so as to provide clearance for a tray lock when the advertising medium support is engaged with an airline tray in an up-and-locked position for viewing the advertising medium through the transparent window.

5. A combination airline fold-down tray, unitary advertising medium support apparatus and an advertising medium comprising:

a fold-down airline tray for attachment to an airline seat;

an advertising medium; and an advertising medium support comprising:

a generally rectangular and planar ad plate providing a transparent window positioned within a front surface thereof, the transparent window engaging the advertising medium within a means defining a slot, the slot being positioned peripherally about the entire transparent window, the ad plate being primarily defined by an ad plate peripheral edge comprising two pairs of opposing parallel edge portions, including a top and bottom opposing edges and a left side and a right side opposing edges;

a side edge flange depending laterally from each one of the left and the right side opposing edges of the ad plate, the edge flanges each directed laterally away from a rear surface of the ad plate and configured with a means for gripping the airline-type tray with the advertising medium support engaged with the airline-type tray; and a bottom flange position limiting means depending laterally from the bottom edge and directed away from the rear surface.

6. The apparatus of claim 5 further comprising a lock clearance notch provided in the top edge of the ad plate so as to provide clearance for a tray lock when the advertising medium support is engaged with the airline tray in an up-and-locked position for viewing the advertising medium through the transparent window.

\* \* \* \* \*